(12) United States Patent
Yang et al.

(10) Patent No.: US 12,544,082 B2
(45) Date of Patent: Feb. 10, 2026

(54) BIOMIMETIC DESERT BEETLE SELF-TRANSPORTING BONE MICROGRINDING HEAD AND PREPARATION PROCESS THEREOF

(71) Applicant: QINGDAO UNIVERSITY OF TECHNOLOGY, Shandong (CN)

(72) Inventors: Min Yang, Shandong (CN); Ming Kong, Shandong (CN); Yuying Yang, Shandong (CN); Changhe Li, Shandong (CN); Zongming Zhou, Shandong (CN); Naiqing Zhang, Shandong (CN); Runze Li, Shandong (CN)

(73) Assignee: QINGDAO UNIVERSITY OF TECHNOLOGY, Shandong (CN)

( * ) Notice: Subject to any disclaimer, the term of this patent is extended or adjusted under 35 U.S.C. 154(b) by 181 days.

(21) Appl. No.: 18/569,221

(22) PCT Filed: Dec. 21, 2022

(86) PCT No.: PCT/CN2022/140739
§ 371 (c)(1),
(2) Date: Dec. 12, 2023

(87) PCT Pub. No.: WO2023/246034
PCT Pub. Date: Dec. 28, 2023

(65) Prior Publication Data
US 2025/0114102 A1    Apr. 10, 2025

(30) Foreign Application Priority Data
Jun. 21, 2022  (CN) .......................... 202210706253.5

(51) Int. Cl.
*A61B 17/16* (2006.01)
*C25D 3/12* (2006.01)
(Continued)

(52) U.S. Cl.
CPC ............ *A61B 17/1644* (2013.01); *C25D 3/12* (2013.01); *C25D 5/36* (2013.01); *C25D 5/50* (2013.01);
(Continued)

(58) Field of Classification Search
CPC . A61B 17/1644; A61B 17/16; A61B 17/1615; A61B 2017/1651;
(Continued)

(56) References Cited

U.S. PATENT DOCUMENTS 6,410,877 B1 * 6/2002 Dixon ...................... B23H 9/00
219/69.17
6,443,967 B1 * 9/2002 Kadavy .......... A61B 17/320758
606/159
(Continued)

FOREIGN PATENT DOCUMENTS

| CN | 203815533 | 9/2014 |
| CN | 104771202 | 7/2015 |

(Continued)

OTHER PUBLICATIONS

"International Search Report (Form PCT/ISA/210) of PCT/CN2022/140739", mailed on Feb. 9, 2023, with English translation thereof, pp. 1-7.
(Continued)

*Primary Examiner* — Jessica Weiss
(74) *Attorney, Agent, or Firm* — JCIPRNET

(57) ABSTRACT

A biomimetic desert beetle self-transporting bone microgrinding head and a preparation process thereof, and relates to the field of medical instruments. The microgrinding head includes a hydrophobic matrix or a matrix having a hydrophobic plating layer. The matrix has a hydrophobic surface on which several hydrophilic abrasive particles are uniformly distributed. A process for preparing the microgrind-
(Continued)

ing head is: selecting diamond abrasive particles and conducting oxidization treatment of the diamond abrasive particles; forming a hydrophobic matrix by scanning a surface of the matrix with a laser; or alternatively obtaining a hydrophobic plating layer by a chemical modification method; and combining the oxidized diamond abrasive particles with the hydrophobic matrix or the hydrophobic plating layer by electroplating to obtain a microgrinding head. The microgrinding head utilizes to achieve an effect of being capable of cooling rapidly and capturing cooling medium droplets and effectively transporting the droplets to a grinding arc region.

11 Claims, 9 Drawing Sheets

(51) Int. Cl.
  *C25D 5/36* (2006.01)
  *C25D 5/50* (2006.01)
  *C25D 15/00* (2006.01)
  *A61B 17/00* (2006.01)

(52) U.S. Cl.
  CPC .... *C25D 15/00* (2013.01); *A61B 2017/00526* (2013.01); *A61B 2017/00938* (2013.01); *A61B 2017/00942* (2013.01); *A61B 2017/1651* (2013.01)

(58) Field of Classification Search
  CPC  A61B 2017/00526; A61B 2017/00938; A61B 2017/00942; C25D 3/12; C25D 5/36; C25D 5/50; C25D 15/00
  USPC ..................................................... 606/79–85
  See application file for complete search history.

(56) References Cited

U.S. PATENT DOCUMENTS

| | | | | |
|---|---|---|---|---|
| 2001/0054224 | A1* | 12/2001 | Corbin | B23B 27/20 623/18.11 |
| 2008/0221580 | A1* | 9/2008 | Miller | A61B 17/1622 606/80 |
| 2012/0259336 | A1* | 10/2012 | del Rio | A61B 17/162 606/80 |
| 2012/0259337 | A1* | 10/2012 | del Rio | A61B 17/1617 29/428 |
| 2019/0150955 | A1* | 5/2019 | Li | A61B 17/1622 |
| 2019/0343599 | A1* | 11/2019 | Brites | A61C 3/02 |

FOREIGN PATENT DOCUMENTS

| | | |
|---|---|---|
| CN | 105147356 | 12/2015 |
| CN | 206275719 | 6/2017 |
| CN | 107789029 | 3/2018 |
| CN | 108113729 | 6/2018 |
| CN | 113385393 | 9/2021 |
| CN | 115044950 | 9/2022 |

OTHER PUBLICATIONS

"Written Opinion of the International Searching Authority (Form PCT/ISA/237) of PCT/CN2022/140739", mailed on Feb. 9, 2023, with English translation thereof, pp. 1-11.

"Office Action of China Counterpart Application", issued on Apr. 27, 2023, with English translation thereof, p. 1-p. 14.

Wang Chuanliu, "Experimental Study on Matrix Wear Resistance of Bionic Coupling Bits", Procedia Engineering, vol. 73, Dec. 2014, pp. 98-102.

* cited by examiner

Unilateral droplet falling in heterogeneous interface

Bilateral droplet falling in heterogeneous interface

Droplet falling in heterogeneous interface

BIOMIMETIC DESERT BEETLE SELF-TRANSPORTING BONE MICROGRINDING HEAD AND PREPARATION PROCESS THEREOF

CROSS-REFERENCE TO RELATED APPLICATION

This application is a 371 of international application of PCT application serial no. PCT/CN2022/140739, filed on Dec. 21, 2022, which claims the priority benefit of China application no. 202210706253.5, filed on Jun. 21, 2022. The entirety of each of the above mentioned patent applications is hereby incorporated by reference herein and made at least a part of this specification.

TECHNICAL FIELD

The present invention relates to the field of medical instruments, and in particular to a biomimetic desert beetle self-transporting bone microgrinding head and a preparation process thereof.

BACKGROUND

Bone grinding is often a very important part in various operations, such as intracranial tumor resection surgery, minimally invasive neurosurgery, plastic surgery and the like. However, in the process of high-speed grinding, bleeding, nerve injury and bone necrosis often occur. Therefore, pouring-type saline is often used as a coolant clinically to reduce heat generation. However, under this method, the maximum grinding temperature will reach 43° C. When the temperature reaches 50° C., bones will suffer from thermal damage to varying degrees, and a nerve tissue will suffer from thermal damage just at 43° C. Such high temperatures pose potential threats and are related to the success or failure of bone microgrinding surgery.

In order to solve the bottleneck problem of thermal damage, ZL 201510218166.5 discloses a handheld surgical grinding temperature online detection and nanofluid phase-change heat-exchange grinding device, wherein an inner-conical nanofluid phase-change heat-exchange grinding head is adopted as the grinding head. The grinding head is composed of a hollow shaft that can be divided into an evaporation section, an adiabatic section, and a condensation section, and there is a coolant in the hollow shaft. By evaporating, condensing and refluxing the nanofluid, the generation of heat is reduced. ZL 201510604803.2 discloses an electrostatic atomization inner-cooling grinding head, which is composed of an inner-cooling grinding head and an electrostatic atomization film-forming device. The inner-cooling grinding head has a double spiral pore channel that runs through the grinding head and a grinding head handle therein, which can realize spraying the nanofluid into a grinding region through the pore channel, thereby taking away the grinding debris and reducing heat.

ZL 201711164696.1 discloses an electrostatic atomization ultrasonic wave-assisted low-damage controllable grinding device for biological bone, wherein a spindle can realize longitudinal-torsion and rotational movements of the grinding head, improving the discharge efficiency of bone chips; and the grinding head has weak hydrophilicity, which can improve the efficiency of allowing saline to enter the grinding region, enhance the convection heat transfer in the grinding region, and reduce the temperature. 201620559363.3 discloses a grinding drill for bone grinding. A grinding head handle is designed in a supporting rod. The grinding head handle is connected to a grinding head. The supporting rod is designed with a limiting device. The structural design improves the accuracy and progress of the operation.

The inventor has found that for the existing bone microgrinding device, since air flow is generated when the grinding head rotates at a high speed and the air flow forms a barrier layer to prevent saline from entering the grinding region, or in case that an ordinary grinding head or a grinding head of a single hydrophilic mode is used, under conditions that the saline enters the grinding region, droplets collide with the grinding head and self-eject, resulting in the problem of being unable to condense and nucleate quickly; the droplets entering a hydrophilic region spread and cannot leave a hydrophilic surface quickly, resulting in the problem that the temperature cannot be lowered quickly.

SUMMARY

In view of the shortcomings of the prior art, an objective of the present invention is to provide a biomimetic desert beetle self-transporting bone microgrinding head and a preparation process thereof. By designing the microgrinding head, the microgrinding head utilizes a combination of hydrophilicity and hydrophobicity to achieve an effect of being capable of cooling rapidly and the like; and being capable of capturing cooling medium droplets and effectively transporting the droplets to a grinding arc region.

In order to achieve the aforementioned objective, the present invention is achieved through the following technical solutions.

In a first aspect, an embodiment of the present invention provides a biomimetic desert beetle self-transporting bone microgrinding head, which includes a hydrophobic matrix or a matrix having a hydrophobic plating layer, wherein hydrophilic abrasive particles are evenly distributed on the hydrophobic matrix or the hydrophobic plating layer.

As a further implementation, oxidized diamond abrasive particles are used as the hydrophilic abrasive particles; and the hydrophilic abrasive particles are arranged on the surface of the hydrophobic matrix or the hydrophobic plating layer through electroplating.

In a second aspect, an embodiment of the present invention further provides a biomimetic desert beetle self-transporting bone microgrinding head, which includes a matrix. A surface of the matrix is alternately provided with hydrophilic stripes and hydrophobic stripes along a circumferential direction, the surface of the matrix is evenly provided with a plurality of grooves along the circumferential direction, and diamond abrasive particles are disposed in the grooves.

As a further implementation, a width of the groove is smaller than those of the hydrophilic stripes and the hydrophobic stripes; and
  the grooves are filled with an adhesive to fix the diamond abrasive particles.

In a third aspect, an embodiment of the present invention further provides a process for preparing a biomimetic desert beetle self-transporting bone microgrinding head, which includes:
  selecting diamond abrasive particles and conducting oxidization treatment of the diamond abrasive particles;
  forming a hydrophobic matrix by scanning a surface of the matrix with a laser; or alternatively obtaining a hydrophobic plating layer by a chemical modification method; and binding the oxidized diamond abrasive particles with the hydrophobic matrix or the hydrophobic plating layer by electroplating to obtain a microgrinding head capable of capturing a droplet of a cooling medium.

As a further implementation, firstly diamond abrasive particles with the same volume and similar structure are selected, then the diamond abrasive particles are put into a tube furnace, and pure nitrogen is introduced into the tube furnace; and the tube furnace has a heating temperature greater than 600° C., and a high-temperature oxidation time of 10-20 min.

As a further implementation, the matrix of the microgrinding head is placed in an ultrasonic cleaner and cleaned for a set time and then dried at room temperature. The dried matrix is scanned by a laser for a set time, then soaked in a solution of stearic acid in absolute ethanol, taken out and then dried at room temperature to form the hydrophobic matrix.

As a further implementation, the matrix of the microgrinding head is pretreated; the pretreated matrix as a cathode and a pure nickel plate as an anode are put into a plating solution, and subjected to electrodeposition treatment by heating in water bath; and the matrix after the electrodeposition treatment is placed in the ethanol solution for a set time, and dried to obtain the hydrophobic matrix.

In a fourth aspect, an embodiment of the present invention further provides a process for preparing a biomimetic desert beetle self-transporting bone microgrinding head, which includes:

pretreating a surface of a matrix, and then forming sequentially arranged hydrophilic stripes on the surface of the matrix by scanning with a laser;

placing and soaking the laser-treated matrix in an anhydrous ethanol solution for a set time, and then drying to turn the hydrophilic stripes into hydrophobic stripes;

scanning the matrix having the hydrophobic stripes with the laser again to remove an anhydrous ethanol film on the surface of the matrix, so as to obtain alternatively arranged hydrophilic stripes and hydrophobic stripes; and notching grooves on the surface of the matrix with intervals along a circumferential direction, and disposing diamond abrasive particles in the grooves.

As a further implementation, the grooves are filled full of an adhesive and the diamond abrasive particles are put into the grooves; and the diamond abrasive particles are bonded and fixed by heat treatment.

The beneficial effects of the present invention are as follows.

(1) In the present invention, by designing the microgrinding head, the microgrinding head utilizes a combination of hydrophilicity and hydrophobicity to achieve an effect of being capable of cooling rapidly and the like; and being capable of capturing cooling medium droplets and effectively transporting the droplets to a grinding arc region.

(2) For the microgrinding head of the present invention, a hydrophobic surface is designed on the matrix, or a texture having a pattern of hydrophilic and hydrophobic stripes is directly designed on the matrix, so that by utilizing a combination of the hydrophilic and hydrophobic self-transport mechanisms onto the microgrinding head, the following three self-transporting modes can be realized: a nanofluid cooling medium is quickly transported from the hydrophobic region to the hydrophilic region, and then quickly falls off in the hydrophilic region, or alternatively the nanofluid cooling medium directly nucleates and falls off in the hydrophilic region, or alternatively the nanofluid cooling medium directly falls off in the hydrophobic region, which can not only realize the self-transportation of the cooling medium, promote the wetting of the cooling medium at the interface of microgrinding tool/bone, strengthen the heat transfer in a microgrinding arc region and reduce the microgrinding temperature; but also realize the self-cleaning of the grinding tool to solve the problem that the microgrinding tool is easy to be blocked.

BRIEF DESCRIPTION OF DRAWINGS

The accompanying drawings of the specification which form a part of the present invention are used for providing further understanding of the present invention. The illustrative embodiments of the present invention and the description thereof are used for explaining the present invention, and do not constitute improper limitation of the present invention.

Among them, 1—spindle system, 2—endoscope, 3—microgrinding head, 4—atomizing nozzle, 5—liquid storage tank, 6—ultrasonic sounder, 7—hydraulic pressure station, 8—unoxidized diamond abrasive particles, 9—oxidized diamond abrasive particles, 10—wettability surface, 11—droplets, 12—droplets, 13—wettability surface, 14—droplets, 15—wettability surface, 16—hydrophobic stripes, 17—hydrophilic stripes; 18—hydrophilic surface at heterogeneous interface, 19—hydrophobic surface at heterogeneous surface, 20—hydrophobic matrix, 21—hydrophilic abrasive particles, 22—droplets, 23—laser device, 24—half wave plate, 25—polarizing plate, 26—attenuating plate, 27—dichroic mirror, 28—focusing objective lens, 29—rotating platform;

4001—spindle housing, 4002—liquid inlet, 4003—vertical hole, 4004—transverse hole, 4005—pressure chamber, 4006—mixed liquid channel.

DETAILED DESCRIPTION

Example 1

Figure 10:
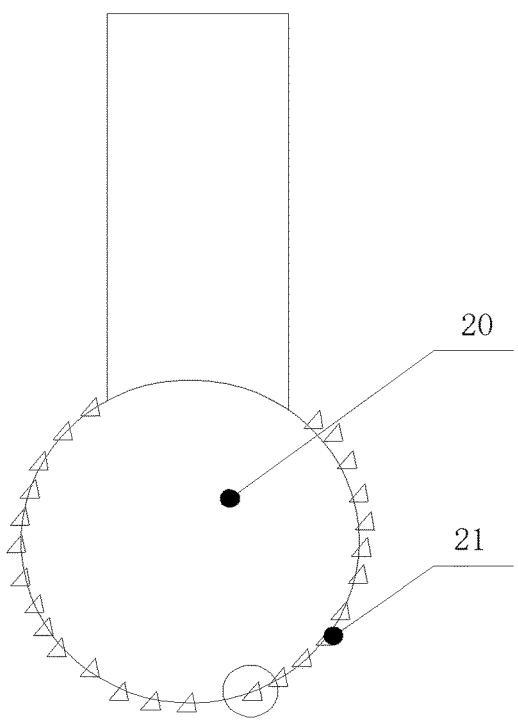
FIG. 10 is a schematic structural diagram of the microgrinding head according to one or more embodiments of the present invention.
Figure 11:
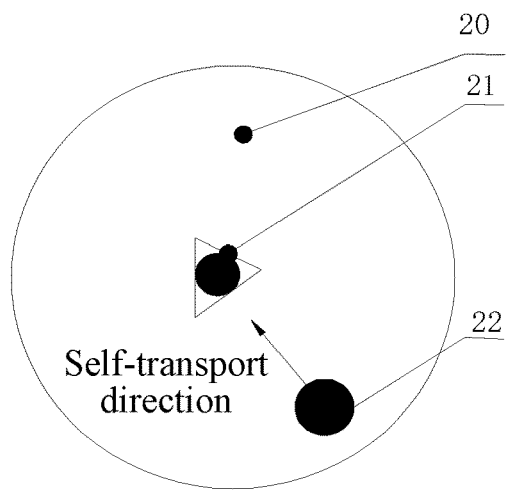
FIG. 11 is a schematic diagram of the self-transport of the droplets on hydrophilic abrasive particles and a hydrophobic matrix according to one or more embodiments of the present invention.

This example provided a biomimetic desert beetle self-transporting bone microgrinding head. A matrix of the microgrinding head 3 had a spherical structure. As shown in FIGS. 10 and 11, the microgrinding head 3 included a hydrophobic matrix 20 and hydrophilic abrasive particles 21 that were uniformly distributed on the surface of the hydrophobic matrix 20.

Figure 2:
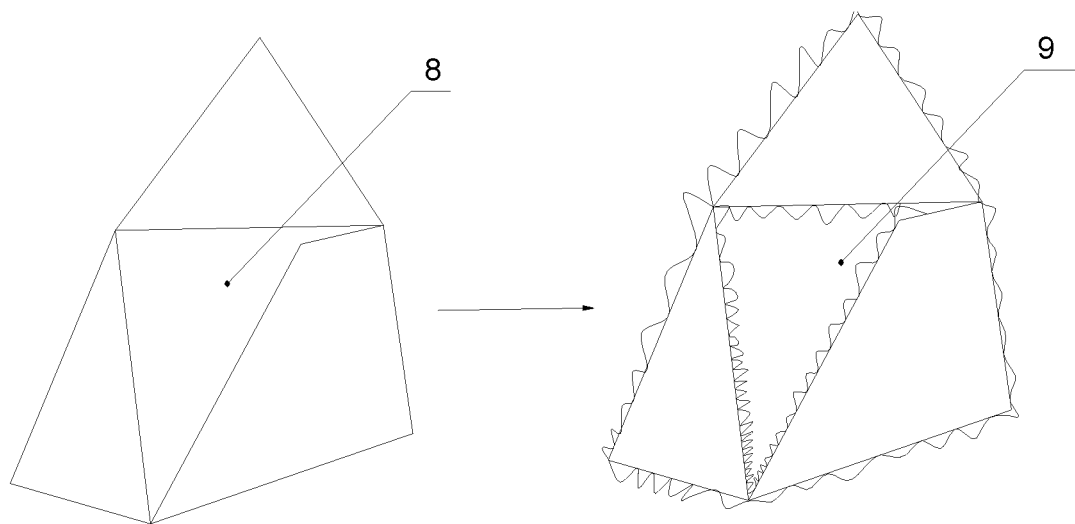
FIG. 2 is a schematic diagram of hydrophilization of the grinding head according to one or more embodiments of the present invention.

Diamond abrasive particles were adopted as the hydrophilic abrasive particles 21 of this example. A diamond material was one of the hardest substances in nature and was characterized by high thermal conductivity, outstanding chemical inertness, and superstrong hardness. Meanwhile, the diamond had stronger lipophilic and hydrophobic properties, and its contact angle was between 80° and 120°. Moreover, the diamond abrasive particles would form a hydrophobic surface if under conditions of surface hydrogenation; as shown in FIG. 2, under the conditions of surface oxidation, the diamond abrasive particles would have a hydrophilic surface, so as to change from unoxidized diamond abrasive particles 8 to oxidized diamond abrasive particles 9.

A process for preparing the microgrinding head of this example was:

Step 1: realization of hydrophilization of diamond abrasive particles. Diamond abrasive particles with the same volume and similar structure were selected and fully oxidized through a chromic acid solution without generating hydrogen gas. The oxidation would roughen the surfaces of the diamond abrasive particles, and making the diamond abrasive particles hydrophilic or hydrophobic was to change the micromechanism or roughness of the surfaces. The roughened diamond abrasive particles would exhibit hydrophilicity, so the process was called hydrophilization of the diamond abrasive particles. The oxidized diamond abrasive particles had many advantages, including improved degree of binding with the matrix and enhanced grinding performance, etc.

Step 2: hydrophobization of the matrix of the microgrinding head or the plating layer on the matrix. The manufacturing of the hydrophobic matrix 20 was to make full use of the principle of a laser and to scan a surface of the matrix by controlling the different parameters of the laser, so as to change the nano-structure of its surface, thereby achieving a good hydrophobic effect. The manufacturing of a hydrophobic plating layer was to prepare a hydrophobic plating layer with good wear resistance and corrosion resistance by a principle of reducing the surface energy while trapping air through full binding of the nickel layer with myristic acid via a chemical modification method.

Step 3: binding of the hydrophilic abrasive particles 21 with the hydrophobic plating layer or the hydrophobic matrix 20. Generally, by electroplating, the abrasive particles were effectively arranged, and the occurrence of nickel nodules could be prevented, which had a good self-transportation function, effectively eliminate bone chips, improve the quality of the grinded surface, and reduce grinding temperature.

Specifically, the preparation process was as follows:

(1) Hydrophilization of Diamond Abrasive Particles:

in the process of high-temperature oxidation, the diamond abrasive particles subjected to sp orbital hybridization with 4 carbon atoms with slightly lower electronegativity due to the invasion of oxygen atoms, forming a regular tetrahedron. There were 2 strongly repulsive arc pair electrons and 1 shared electron in the regular tetrahedron, so a dipole was formed at the terminal of the surface of the diamond, and also since there was no shared electron between the oxygen atom and the dipole, they could hardly interact with each other or weakly interact with each other. It just provided conditions for high temperature to erode the surface of the diamond, and the weak-bond dipole formed on the surface quickly vaporized from the surface, leaving defect structures such as pits or micro-pits on the surface. It had also been found by research that CO desorption was formed after the oxygen atoms on the surface of the diamond were heated, thereby forming defects on the surface of the diamond. At the same time, the carbon atoms on the surfaces of the diamond abrasive particles underwent an oxidation reaction, so as to further generate a carbonyl group ($C=O$), a carboxyl group (—COOH), a hydroxyl group (—OH) and the like. These groups were beneficial to the hydrophilicity of the surfaces of the diamond particles. Therefore, under the action of micro-pit defects and hydrophilic groups, the surfaces of the diamond abrasive particles became hydrophilic.

As shown in FIG. 2, after the diamond abrasive particles were subjected to hydrophilization treatment, the roughness on the surfaces of the abrasive particles would be increased, and many pits and the like irregular patterns would appear, which was conducive to hydrophilization and effectively improved the binding degree of the diamond abrasive particles with the matrix of the grinding head. The durability and durable life were both improved. At the same time, if an electroplating method was adopted, the occurrence of a nodulation phenomenon would be effectively suppressed.

By screening the diamond abrasive particles, the diamond abrasive particles had the same volume and similar structure, which was conducive to the controllability and arrangement of the abrasive particles. Diamond oxidation was then conducted. Before starting, the tube furnace needed to be detected for air tightness. Then the diamond abrasive particles were slowly put into the middle of a tube furnace. Because the temperature was the highest at the position of furnace core, the temperature decreased as the distance from the furnace core increased. A refractory furnace plug was installed to seal a furnace mouth, and add a device for preventing back suction was added at an end of the furnace. A vent valve was opened to introduce 99.99% pure nitrogen. Because surface nitriding treatment would aggravate the oxidation of the diamond and the nitrogen treatment efficiency was greater than those of oxygen, air and the like gases, nitrogen was selected as the treatment gas. The bubble generation rate in a bottle of an anti-suck-back device was controlled to 1-2 bubbles per second. The heating rate was controlled to be about 10° C./min. The temperature was raised to a specified temperature. Also, the oxidation time was designed. The hydrophilicity of the oxidized diamond abrasive particles was shown in FIG. 3. The specified temperature was more than 600° C. because the diamond abrasive particles could be effectively oxidized only at more than 600° C., and the temperature should not be too high.

Figure 3:
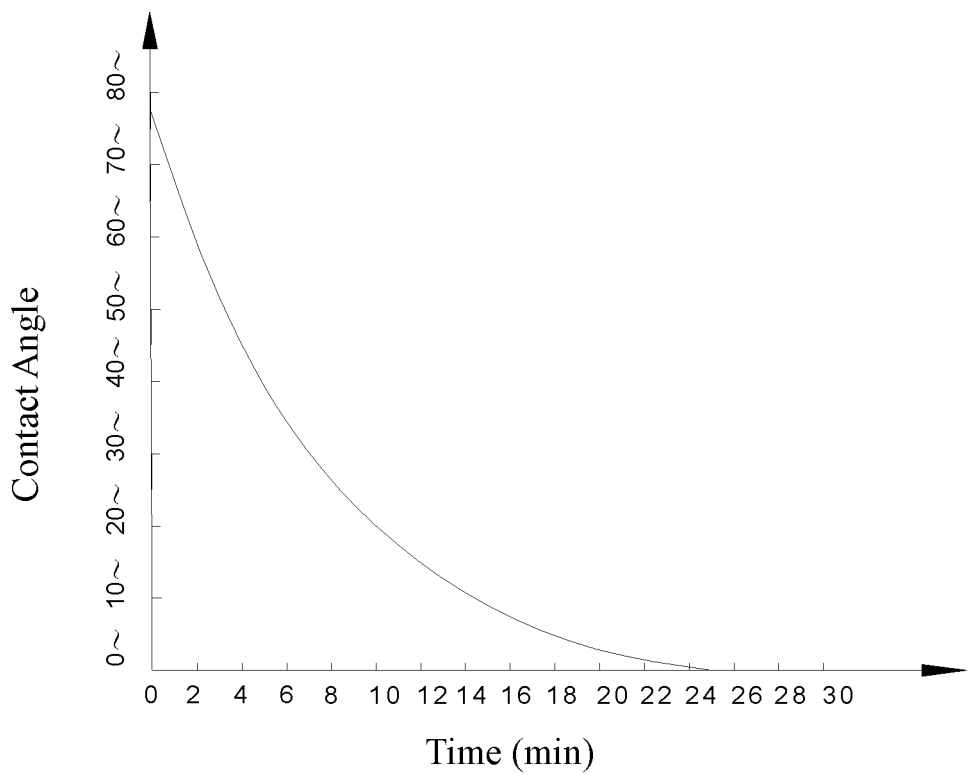
FIG. 3 shows the change in a contact angle of diamond abrasive particles oxidized at high temperature over time.

As shown in FIG. 3, the contact angle changed over time, and the contact angle of the untreated diamond abrasive particles was between 87° and 70°. During the high-temperature oxidation process, after 10 min of oxidation treatment, a contact angle of the diamond abrasive particles was about 20°, showing hydrophilicity. After 20 min of oxidation treatment, the contact angle of the diamond abrasive particles was 5°, showing super hydrophilicity. Due to the graphitization of the diamond, the cutting performance of the diamond was affected. So it was not that the higher the temperature, the better.

(2) hydrophobization:

630 or 420b stainless steel was selected as the material of the grinding head in this example. The material of the matrix of the grinding head could meet the strength requirements of bone microgrinding. An intrinsic contact angle of the stainless steel matrix was detected to be 85°, which was weakly hydrophilic. In order to reduce the cost and make it widely used, in this example, laser processing was conducted on the grinding head made of a stainless steel material.

The microgrinding head was placed into an ultrasonic cleaner. Ethanol and distilled water were put into the ultrasonic cleaner, and the microgrinding head was cleaned for 15-20 minutes and then dried at room temperature. In this example, the laser had a wavelength of 850-1000 nm, a pulse width of 160 fs-160 ps, and a frequency of 1-200 kHz, the beam was focused to a spot size of 25-50 um, and the scan line overlap was set to 55%.

The scanned microgrinding head was a hydrophilic matrix, and then the grinding head was put into and soaked in a 0.02-0.1 mol/L solution of stearic acid in absolute ethanol for one hour, taken out and dried at room temperature until it became a hydrophobic matrix. By controlling various parameters of the laser, the microstructure of the hydrophobic matrix was nanoneedles, which had a good hydrophobic effect. Then, by arranging individual particles in an orderly and controllable manner, the abrasive particles were installed on the matrix without covering the hydrophobic matrix.

A method for modifying the hydrophobic plating layer was as follows:

the first step was to pretreat the matrix of the microgrinding head, and the processing process was the same as above.

The second step was to formulate a plating solution. The specific composition of the plating solution was that: the pH value was adjusted to 4.5-5.0, a 20-30 g/L boric acid ($H_3BO_3$) solution was used as a buffering agent, a 20-30 g/L potassium chloride (KCl) solution was used as an anode activator, 200 g/L $NiCl_2 \cdot 6H_2O$ was used as an ion source, and 0.1 g/L SDBS was used as an anti-pitting additive. The third step was electrodeposition treatment. After the plating solution was formulated, the matrix of the processed grinding head as the cathode and the pure nickel plate as the anode were put into the plating solution. The temperature was controlled at 60-70° C. and a manner of heating in water bath was adopted. The plating solution was stirred thoroughly and powered on, and the electrodeposition time was controlled to be ten minutes.

At a low electrodeposition current density, the cathodic polarization effect was small and a deposit growth speed was faster than a nucleation rate, so that the nickel grain size was large. As the current density increased continuously, the cathode overpotential increased with the increase in the current density, which could provide an additional driving force for crystal nucleation, causing the crystal nucleation speed to be faster than the crystal growth rate, thereby making the coating layer dense. When the current density further increased and the current density reached a diffusion limit, the deposition process would be controlled by the diffusion overpotential, so that only some nickel particles continued to grow, while other particles were passivated. The other one was a hydrogen evolution reaction, which hindered the uniform movement of nickel ions to the surface of the cathode. Therefore, the selected current density was preferably 6-8 a/dm$^2$.

Then the electroplated grinding head was cleaned and dried. The fourth step was hydrophobization. Due to the high activity of the surface of fresh nickel, the surface was easily oxidized into —OH bonds under the action of myristic acid. Myristic acid molecules would be connected with these products and formed ionic complexes, further reducing the surface energy. Also due to the binding of the nickel layer and myristic acid, the region of the coating layer was filled full of air. The trapped air acted as an air cushion to prevent water from fully contacting the surface, so it had excellent hydrophobicity. The processed grinding head was put into a solution of myristic acid in ethanol with a concentration of 0.1-0.2 mol/L. The time of the grinding head in the solution was 60 min. Finally, the grinding head was taken out and dried in an oven for 120 minutes, with the temperature being controlled at 60° C. The final plating layer had good hydrophobicity. The hydrophobic plating layer after the aforementioned treatment had been tested to have high mechanical stability, good wear resistance, and good corrosion resistance.

In the same way, a Ni—Co plating layer could also be prepared using the electrodeposition method. Just after the preparation was completed, the contact angle of the plating layer in saline was 0°, showing super hydrophilicity. After being placed in the air for two weeks, the plating layer became in a super hydrophobic state. Therefore, in order to better realize the hydrophilic and hydrophobic structures on the microgrinding head, the modification method was not unique.

The characteristics of the self-transporting microgrinding head of this example were: the first characteristic was that the grinding head was small, generally at a millimeter level, and only the microgrinding head could achieve the effects of convenient use and precise operation during surgery. The second characteristic was that abrasive particles were adhered on the grinding head, the purpose of which was to better maintain the smoothness of a bone tissue during surgery.

(3) Binding of Hydrophilic Abrasive Particles and Hydrophobic Matrix:

the abrasive particles were bound with the matrix by an electroplating manner. Therefore, hydrophilic abrasive particles of preferably the same size and similar structure were allowed to be arranged in an orderly manner on the hydrophobic matrix. The up, down, left and right distances among individual hydrophilic abrasive particles were equal. The hydrophobic interface was under the hydrophilic abrasive particles. During the grinding process, the bone surface first contacted the diamond abrasive particles, thereby effectively protecting a hydrophobic tissue.

At the same time, the hydrophilic abrasive particles not only had the effect of rapid condensation, but also could prevent the appearance of nickel nodules. As the surface roughness of the hydrophilic abrasive particles increased and the degree of binding with the matrix was enhanced, the service life of the microgrinding head was increased, the smoothness during grinding surgery was improved, and the thermal damage was reduced.

In this example, the microgrinding head was reconstructed microscopically, and the hydrophilicity of the diamond abrasive particles was changed by changing the micro-nano structure on the surfaces of the diamond abrasive particles. By controlling the microscopic geometric structure of the matrix and the plating layer, the hydrophobicity of the matrix and the plating layer was changed. At the same time, the mechanism of capillary and adhesive forces of micro-droplets on the hydrophilic surface was revealed, and the rules of influencing the transport mode and transport path of the micro-droplets on the hydrophobic surface was revealed.

Macroscopically, bionics of desert beetles were conducted to explore the rule of self-transport wettability surface parameters (an area of the hydrophilic region, a hydrophilic/hydrophobic region ratio, a hydrophilic region spacing, etc.) of a hydrophilic/hydrophobic combined cooling medium in influencing a self-transport process, such as adhesion and capture, dynamic desorption, directional transport, and the like of saline micro-droplets, so as to realize the parametric reconstruction of surface macro-micro geometric configuration of the hydrophilic/hydrophobic combined self-transport of bionic desert beetle microgrinding head.

In terms of condensation efficiency, the factors influencing an average heat transfer coefficient of the micro-droplets on the hydrophobic surface, the factors influencing an average heat transfer coefficient of the micro-droplets on the hydrophilic surface, and the condensation heat transfer performance of a heterogeneous mixed surface were explored.

Figure 4:
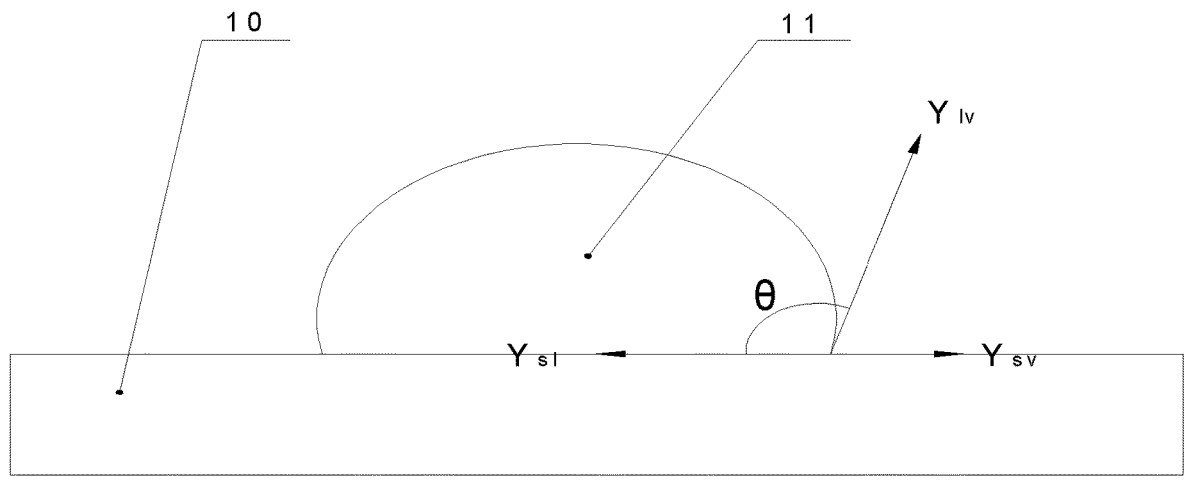
FIG. 4 shows a Young's wetting model of droplets.

Further, the wettability principle of hydrophilic and hydrophobic channels was as follows:

Surface wettability was related to the roughness of the surface structure and surface free energy. On this basis, a wettability model was studied. For the relationship between liquid and solid and the solid-liquid-gas in an equilibrium state under an ideal smooth surface, as shown in FIG. 4, the relationship was as follows:

$$Y_{sv} - Y_{sl} = Y_{lv}\cos\theta_y \quad (1)$$

$Y_{sv}$, $Y_{sl}$, and $Y_{lv}$ respectively represented gas-solid interfacial tension, liquid-solid interfacial tension and gas-liquid interfacial tension.

Figure 5:
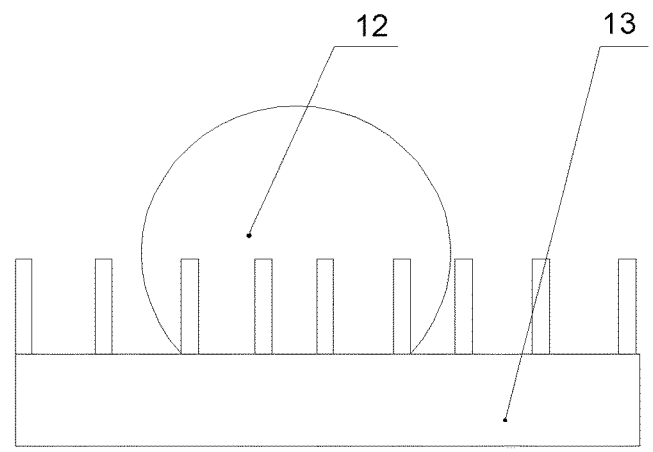
FIG. 5 shows a Wenzel's wetting model of droplets.
Figure 6:
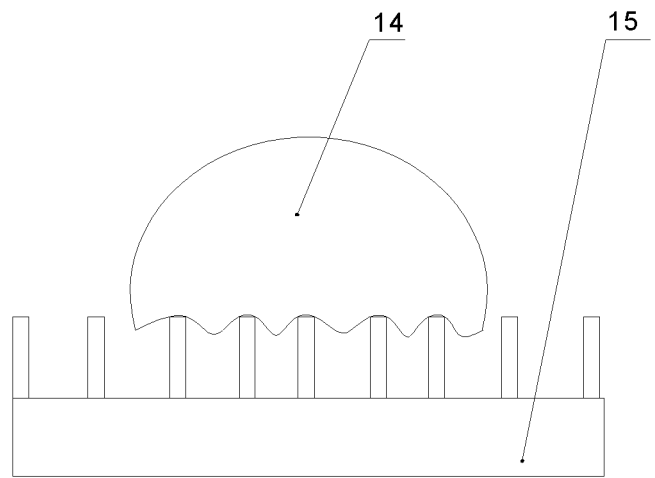
FIG. 6 shows a Cassie's wetting model of droplets.

Taking saline as an example, if a static contact angle of the saline on the solid surface was greater than 65°, the interface was a hydrophobic interface. On the contrary, it was a hydrophilic surface. The hydrophilic and hydrophobic surfaces were normal wettability surfaces. In particular, there was a special wettability surface. When the static contact angle was greater than 150°, it was a superhydrophobic surface, and when the static contact angle was less than 5°, it was a superhydrophilic surface. Since the solid surface was not a purely smooth surface, the solid surface was actually rough. A Wenzel and Cassle model was established based on the solid-liquid contact on the rough surface was whether air was trapped in the bottom layer, as shown in FIGS. 5 and 6.

The Young model was corrected based on the Wenzel model. That was, the droplet entered the pit without trapping air. A characterization roughness factor r was proposed, and the relationship was as follows:

$$\cos\theta_w = r\cos\theta_y \quad (2)$$

$$r \cdot \frac{\gamma_{sv} - \gamma_{sl}}{\gamma_{lv}} = \cos\theta_w \quad (3)$$

where $\theta_w$ was an apparent contact angle of a rough surface. Because r>1, it was obtained from formula (3) that the hydrophilic interface was more hydrophilic and the hydrophobic interface was more hydrophobic.

According to a Cassie model, the Wenzel model was supplemented. That is, the droplets did not completely enter the pit at the bottom layer, and air was trapped between the solid and the liquid. The formula was as follows:

$$\cos\theta_c = f_s(r\cos\theta_y + 1) - 1 \quad (4)$$

where $\theta_c$ was an apparent contact angle of the rough surface, $\theta_y$ was the intrinsic contact angle of the smooth surface, and $f_s$ was the area fraction occupied by the solid protruded in the composite contact face.

Figure 7:
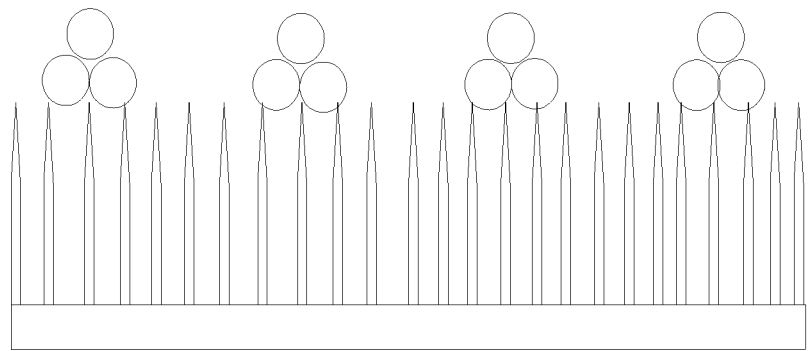
FIG. 7 shows a nanoneedle structure of the surface of a matrix.

It could be seen from the aforementioned formula that the apparent contact angle of the rough surface was greater than the intrinsic contact angle of the smooth surface, the solid-liquid contact area was reduced, the gas-liquid contact area was increased, and the hydrophobic performance was enhanced. Therefore, if it wanted to remove the droplets through condensation ideally, the following three construction principles should be met: First, if the characteristic spacing between nano- or micro-structures was as small as possible, the trapped air between the solid and the liquid would increase, which was beneficial to increasing the gas-liquid contact area. Second, the top of the nano- or micro-structure should be as sharp as possible to reduce the contact area between the solid and the liquid, reduce a viscous force, and facilitate the falling of the droplets. Third, the moderate height of the nano- or micro-mechanism could not only prevent the collapse of the structure and facilitate the friction performance of the mechanism, but also be conducive to increasing the contact area between the solid and the liquid. Therefore, during manufacturing of a hydrophobic structure, various parameters needed to be controlled to create a nanoneedle structure as shown in FIG. 7.

Figure 8:
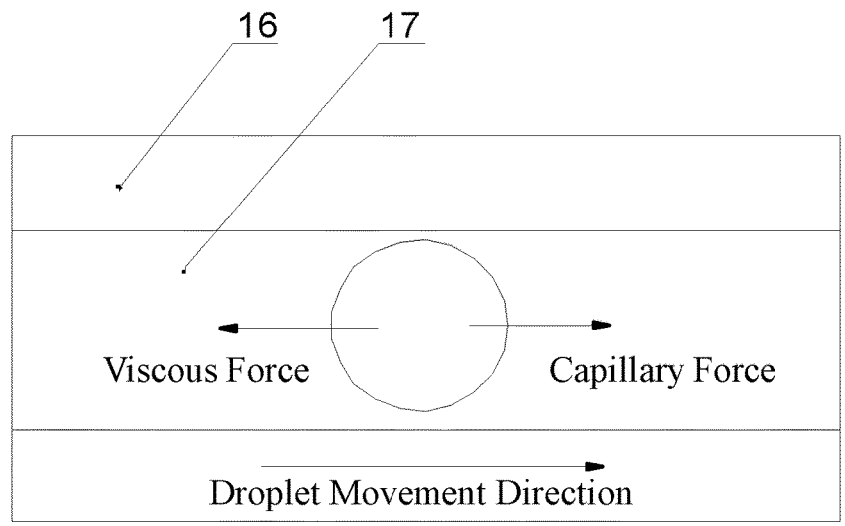
FIG. 8 shows the transport of droplets on a hydrophilic structure.

Principle of Transport on the Hydrophilic Surface:

Nanofluid was mainly affected by a capillary force and a viscous force during self-transport. As shown in FIG. 8, during self-transport, the capillary force was the driving force for the flow of the nanofluid, and the viscous force was the resistance to the flow of the nanofluid. The capillary force was defined as $F_c$, and the expression was as follows:

$$F_c = \frac{2\gamma_{LV}\cos\theta}{R_{eff}} \cdot 2\phi_p t \cdot r \quad (5)$$

-continued $$F_c = \frac{2\gamma_{LV}}{R_{eff}} \cdot 2\phi_p t \cdot r \quad (6)$$

in the formula: $\gamma_{lv}$ was the tension at the liquid-gas interface; $\Phi_p$ was an area ratio of the channel trajectory; t was a total thickness of the trajectory; θ was an equilibrium contact angle; $R_{eff}$ was half the width of a single hydrophilic channel; and r was the radius of the droplet footprint.

$R_{eff} = \frac{1}{2}R$ was substituted into the aforementioned formula, (7)

$$F_c = 8 \cdot \frac{\gamma_{LV}}{R} \cdot \phi_p t \cdot r$$

where R was the width of the hydrophilic channel.

In the aforementioned formula, $\gamma_{lv}$, $\Phi_p$, t and r were all constants or fixed values, so the capillary force was related to the width R of the hydrophilic channel.

The viscous force was defined as $F_h$ during the flow process, and its formula was as follows:

$$F_h = 2h\gamma_{LV}\sum_{n=1}^{k}(\cos\theta_{rn} - \cos\theta_{an}) \quad (8)$$

in the formula, $\theta_{rn}$ and $\theta_{an}$ were the front contact angle on a certain wetting gradient and the rear contact angle on the same gradient respectively;

k was the number of different wetting gradients; $\gamma_{lv}$ was the tension at the liquid-gas interface; and h was a vertical height of the droplet.

Assuming a condition that k=1 the viscous force was.

$$Fh = 2h\gamma_{lv}(\cos\theta_{rn} - \cos\theta_{an}) \quad (9)$$

Therefore, the adhesive force was related to the contact angle and the vertical height of the droplets.

It could be seen from the aforementioned formula that self-transport in the hydrophilic channel could be achieved when the capillary force $F_c$>the viscous force $F_h$. It could also be seen from the formulas (7) and (9) that, the capillary force $F_c$ was inversely proportional to the width R of the hydrophilic channel. The larger the R was, the smaller the $F_c$ was. If the width of the hydrophilic channel was too large and the droplet volume was too small, the droplets would extend longitudinally, which delayed condensation nucleation and reduced the effect of condensation. Assuming that the condensation volume remained unchanged, if the hydrophilic channel was too small, the droplet height would increase, the front contact angle would increase, and the rear contact angle would decrease, resulting in an increase in the viscous force.

Figure 9A:
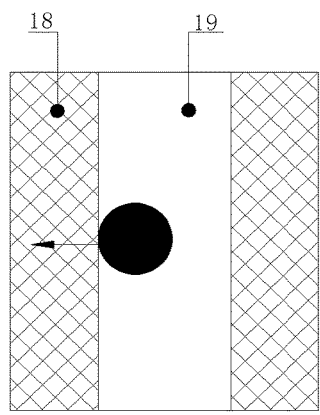
FIGS. 9A-9C shows the transport of the droplets on a hydrophobic structure.
Figure 9B:
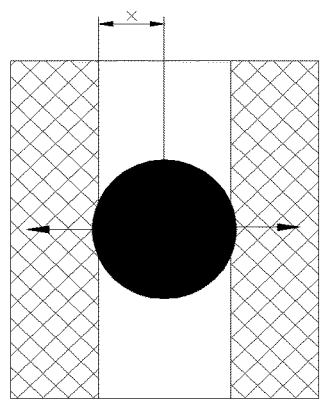
Figure 9C:
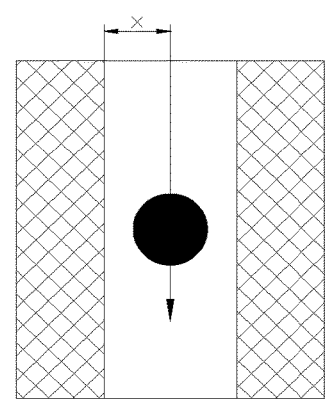

Transport Mechanism of Hydrophobic Stripes:

As shown in FIGS. 9A-9C, the self-transportation of the hydrophobic stripes could be divided into three situations. The first situation was unilateral detachment, wherein the nanofluid was sprayed against the grinding head through a nozzle, and the droplets hit the hydrophobic stripes, the droplet nucleation was small and close to one side of the hydrophilic stripes, and the droplets would self-transport to the hydrophilic side under the influence of surface energy difference. The second situation was bilateral detachment, wherein the droplet nucleation was large and close to both sides of the hydrophilic stripes. The droplets were divided into two parts. One part was transported to the left side of the hydrophobic stripes, and the other part was self-transported to the right side of the hydrophobic stripes. The third situation was slipping, wherein the droplets were small and not close to the hydrophilic stripes. Due to the action of gravity, the droplets slid down along the hydrophobic channel. Therefore, through the self-transportation of the hydrophilic stripes, the self-transportation of the hydrophobic stripes, and the self-transportation of the hydrophilic and hydrophobic stripes on the heterogeneous surface, the transport distance of the droplets could be changed, and the size and thickness of the droplets could be changed at the same time, which directly affected the condensation heat transfer performance. Therefore, the mechanism of condensation heat transfer performance was as follows:

self-transport mechanism of hydrophilic abrasive particles and hydrophobic matrix:
desert beetles had good water collection and self-transport functions through network-like hydrophilic protrusions and hydrophobic spherical faces. The principle was that moisture in the environment condensed into droplets on the hydrophilic protrusions, and then through the action of gravity, the droplets were transported into the mouthparts of the desert beetles on the hydrophobic spherical faces. Its water collection efficiency was as follows:

$$\eta = \frac{m}{st} \quad (10)$$

wherein η represented water collection efficiency, s represented an area of a sample surface, t represented a sample measurement time, and m represented a water collection volume.

Based on the basic principle of wettability, the nanofluid self-transport could be divided into three basic steps: condensation of nanofluid droplets, growth of the nanofluid droplets, and falling of the nanofluid droplets. The specific process was that the nanofluid was fully atomized through the nozzle, and the distribution of cooling droplets was controllable. Then the microgrinding head rotated rapidly, and the fully atomized nanofluid coolant adhered to the microgrinding head. The atomized nanofluid cooling liquid was preferentially captured by the hydrophilic abrasive particles and nucleated on the hydrophilic abrasive particles, and the remaining nanofluid cooling liquid reached the matrix of the microgrinding head. Because the matrix was a hydrophobic material that has no strong adhesion, there would be no tiling phenomenon, and its droplets would be displayed in a hydrophobic manner. If they encountered hydrophilic abrasive particles, they would be preferentially self-transported to the hydrophilic abrasive particles to take away heat. The parts that were not in contact with the hydrophilic abrasive particles would grow preferentially or break away from the matrix due to gravity and the rotational force of the microgrinding head. On the hydrophilic abrasive particles, the preferentially captured nanofluid cooling liquid would nucleate, and the droplets of its hydrophobic matrix would be transported to the hydrophilic abrasive particles for growth. After the droplets reached a certain size, they would fall off from the matrix under the action of a rotational force. Through the hydrophilic and hydrophobic structures, the cooling liquid could be collected quickly, so as to improve the collection rate. The cooling droplets would absorb heat in the form of heat exchange on the microgrinding head, and the rapidly fallen droplets would take away the heat, thereby realizing reduction of the temperature of the grinding region and the improvement of the success rate of the surgery.

Heat transfer coefficient for condensation of droplets on the hydrophobic surface:
heat flow density formula of the hydrophobic surface:

$$q_s = \int_{r_{min}}^{r_c} Q(r)n(r)dr + \int_{r_c}^{r_{max}} Q(r)N(r)dr \qquad (11)$$

where: $r_{min}$, $r_c$, and $r_{max}$ were respectively a droplet nucleation radius, half of an average spacing between adjacent nucleation holes, and a droplet falling distance. Radius; (the judgment of large and small droplets was based on $r_c$ as a boundary, small droplets: $r_{min} < r < r_c$; and large droplets: $r_c < r < r_{max}$.) n(r) and N(r) were the density of small droplets and the density of large droplets respectively; and Q(r) was the heat transfer flux of a single droplet with the radius of r.

According to the Principle of Minimum Gibbs Free Energy:

$$r_{min} = \frac{2T_s\delta}{h_{lv}\rho_a \nabla T} \qquad (12)$$

where: $T_s$ was a saturated steam temperature; $h_{lv}$ was the latent heat of phase change; and $\nabla T$ was the degree of supercooling on a surface.

$$r_c = \sqrt{\frac{1}{4N_c}},$$

where $N_c$ was the density of droplet nucleation sites. After a large number of experiments, it had been found that a reasonable density of droplet nucleation sites was $N_c = 2.5 \times 10^{11}$ m$^{-2}$.

$$Q(r) = \frac{\pi r^2 \sin^2\theta \left(\nabla T - \frac{2T_s\delta}{h_{lv}r\rho_a}\right)}{\frac{1+\cos\theta}{2h_i} + \frac{\theta\sin\theta}{4\pi}\frac{r}{\lambda_1} + \frac{\sigma_p}{\lambda_p}} \qquad (13)$$

$$h_i = \frac{2a_c}{2-a_c} \cdot \frac{\rho_v h_{lv}^2}{T_s} \cdot \sqrt{\frac{M}{2\pi R_g T_s}} \qquad (14)$$

where $h_i$, $\lambda_p$, $\lambda_l$, and $\sigma_p$ were the heat transfer efficiency of a gas-liquid surface, a heat conductivity coefficient of a hydrophobic coating layer, a heat conductivity coefficient of a film-like liquid layer and a thickness of the hydrophobic coating layer, respectively; and $a_c$, M, and $R_g$ were the condensation coefficient, molar mass fraction of a working medium, and a gas constant, respectively.

The density of small droplets was:

$$n(r) = \frac{r}{3\pi r_c^3 r_{max}} \cdot \frac{r_c - r_{min}}{r - r_{min}} \cdot \frac{A_2 r + A_3}{A_2 r_c + A_3} \cdot \left(\frac{r_{max}}{r_c}\right)^{\frac{2}{3}} \cdot \exp(B_1 + B_2) \qquad (15)$$

The density of large droplets was:

$$N(r) = \frac{1}{3\pi r^2 r_{max}} \cdot \left(\frac{r_{max}}{r}\right)^{\frac{2}{3}} \qquad (16)$$

All the formulas were substituted into the general formula (11) to obtain an average heat flux density. It should be noted that the aforementioned formulas were all related to x in FIGS. 9A-9C and related to the position of the droplet, so numerical integration was required to calculate the average heat flux density.

$$q_{b,s} = \frac{2\int_{r_{min}}^{\frac{w_s}{2}} q_s(x)dx}{w_s} \qquad (17)$$

$$h_{b,s} = \frac{q_{b,s}}{\nabla T} \qquad (18)$$

$q_{b,s}$ was the average heat flux density on the hydrophobic surface; $w_s$ was the width of the hydrophobic channel; and $h_{b,s}$ was the average heat transfer coefficient of the hydrophobic stripes.

Heat Transfer Coefficient for Condensation of Droplets on the Hydrophilic Surface:

The condensation mechanism of the hydrophilic stripes could be divided into two parts. One part was the droplets generated by the impact of the nanofluid on the grinding head itself, and the other part was the droplets absorbed through self-transportation in the channels of the hydrophobic stripes. Therefore, the volume of the droplets and the thickness of the liquid film in the hydrophilic stripes were the keys for affecting the heat transfer coefficient of condensation. The formula was as follows:

$$h_{b,q} = \frac{1}{\frac{1}{h_i} + \frac{\sigma_1}{\lambda_1}} \qquad (19)$$

where $\sigma_l$ was the liquid film thickness of the hydrophilic stripes; $h_i$ was the heat transfer coefficient of a gas-liquid interface; $\lambda_l$ was the heat conductivity coefficient of the film-like liquid layer; and $h_{b,q}$ was the heat transfer coefficient of the film of the hydrophilic stripes.

Heat transfer performance of condensation on a heterogeneous mixed surface:
the total condensation heat transfer coefficient of the hydrophilic and hydrophobic heterogeneous surfaces was a weighted average of the condensation heat transfer coefficient of the hydrophilic surface and the condensation heat transfer coefficient of the hydrophobic surface:

$$h_b = \frac{w_s}{w_s + w_q} h_{b,s} + \frac{w_q}{w_s + w_q} h_{b,q} \qquad (20)$$

where $w_q$ was a width of a hydrophilic stripe; and $h_b$ was a total heat transfer coefficient.

Figure 12:
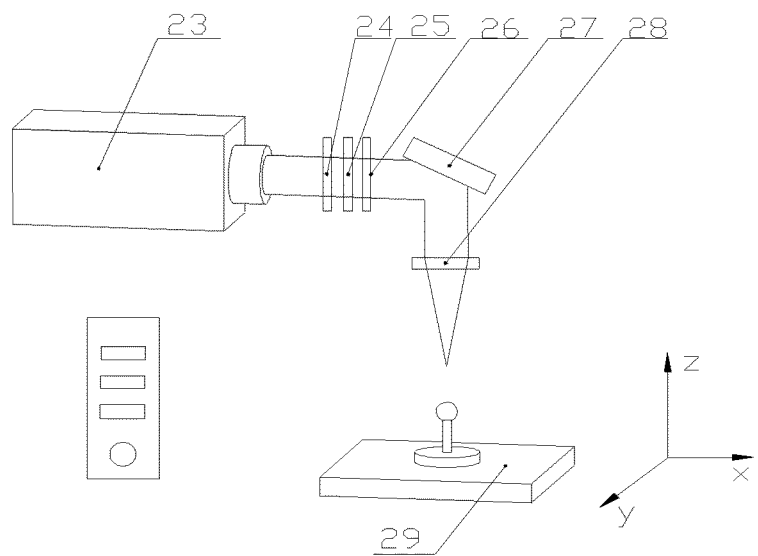
FIG. 12 is a schematic structural diagram of a laser device according to one or more embodiments of the present invention.

Laser Irradiation Mechanism:
laser irradiation was to irradiate a high-density laser beam to a grinding head to be processed. The laser beam would cause melting and vaporization phenomena on the surface of the grinding head under extremely high power and energy density, causing various particles on the surface of the grinding head to quickly break away from the matrix. When these particles encountered air, they quickly condensed and crystallized onto the matrix, forming extremely tiny micro-nano structures that accumulate on the grinding head. The principle of laser irradiation played a role in surface modification and changed the roughness of the surface of the grinding head. The effect was consistent with the fundamental principle of changing the microstructure and surface free energy by hydrophilicity and hydrophobicity. Its schematic structural diagram was shown in FIG. 12.

A laser device 23 was a titanium sapphire laser that utilizes self-locking mode technology. The laser was converted into a laser with a fixed wavelength, low power and high frequency, and then the low-power and high-frequency laser at an oscillation level was converted into a laser pulse with high power and low frequency through a half-wave plate 24, a polarizing plate 25 and an attenuating plate 26. The grinding head could be processed by a six-shaft rotatable platform 29, and the processing of all surfaces and angles of the grinding head could be conducted by the six-degree-of-freedom platform, thereby improving the processing efficiency of the curved grinding head.

Example 2

Figure 13:
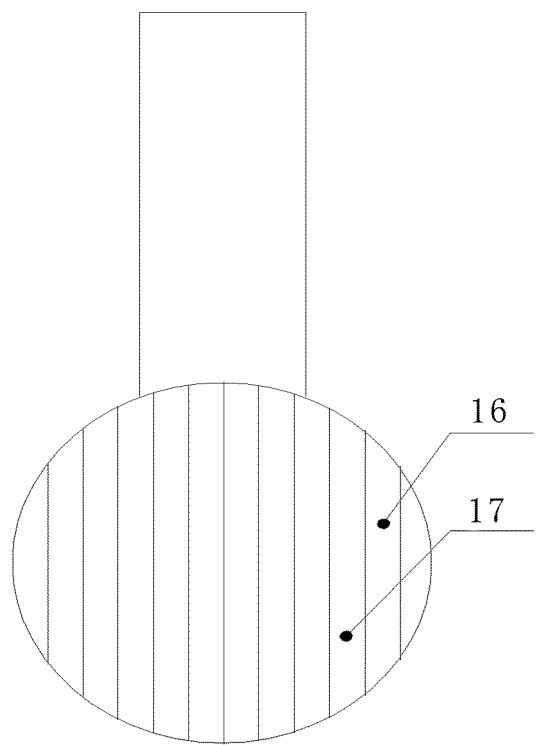
FIG. 13 is a schematic diagram of hydrophilic and hydrophobic stripes on a matrix according to one or more embodiments of the present invention.

This example provided a biomimetic desert beetle self-transporting bone microgrinding head. As shown in FIG. 13, the microgrinding head included a matrix. A surface of the matrix was alternately provided with hydrophilic stripes 17 and hydrophobic stripes 16 along a circumferential direction, wherein the stripes in this example were strip regions that were arranged vertically.

Figure 14:
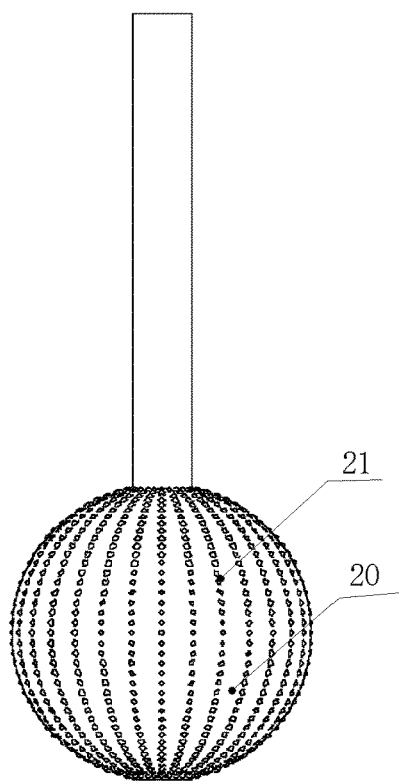
FIG. 14 is a schematic diagram of the orderly arrangement of the hydrophilic abrasive particles and the distribution of the hydrophilic abrasive particles and the hydrophobic matrix according to one or more embodiments of the present invention.

As shown in FIG. 14, a plurality of grooves were evenly arranged on the surface of the matrix along the circumferential direction, and diamond abrasive particles were disposed in the grooves. The diamond abrasive particles were evenly distributed in multiple rows through the grooves.

The preparation process of the microgrinding head in this example was to first form hydrophilic and hydrophobic stripes on the matrix, and then arrange the abrasive particles. The details were as follows.

Firstly, the surface of the microgrinding head was cleaned to remove attachments and the like on the surface, and then put the microgrinding head was put into an ultrasonic cleaner. Ethanol and distilled water were put into the ultrasonic cleaner, and the microgrinding head was cleaned for 20 minutes. 420b or 630 stainless steel was selected as the material of the grinding head. An intrinsic contact angle of the stainless steel matrix was detected to be 85°, which was weakly hydrophilic. The laser had a wavelength of 950 nm, a pulse width of 160 ps, and a frequency of 100 kHz, the beam was focused to a spot size of 25 μm, and the scan line overlap was set to 55%.

The scanned microgrinding head was hydrophilic strips 17, and then the microgrinding head was put into and soaked in a 0.05 mol/L solution of stearic acid in absolute ethanol for one hour, taken out and dried at room temperature until it became hydrophobic strips 16. The microgrinding head with hydrophobic stripes was subjected to patterned laser scanning again, and the film of the stearic acid in anhydrous ethanol attached to the surface of the microgrinding head was removed to obtain a pattern of hydrophilic and hydrophobic stripes.

Further, the abrasive particles were bound onto the matrix. As shown in FIG. 14, the diamond abrasive particles were first screened to select diamond abrasive particles of the same size. After the hydrophilic and hydrophobic stripes were achieved, grooves were further notched by a laser to ensure that the grooves did not cover the hydrophilic and hydrophobic structures (the width of the groove was smaller than the width of the hydrophilic stripes 17 and the hydrophobic stripes 16) and were evenly distributed; and the grooves were distributed in multiple rows and columns. The uniform distribution of the grooves was to ensure that the distance between two adjacent grooves was equal, the distance between a row of grooves and the adjacent row of grooves was equal, and the distance between a column of grooves and the adjacent grooves was equal.

The grooves were then filled full of an adhesive. The screened diamond abrasive particles were put into the grooves, and it was ensured that the amount of the adhesive was moderate and the adhesive would not cover the structure of hydrophilic and hydrophobic stripes. Heating was further conducted to ensure that the diamond abrasive particles were firmly fixed on the matrix of the microgrinding head, and then the remaining adhesive was cleaned up. Finally, hydrophilic and hydrophobic structures were achieved under the abrasive particles, and it was ensured that the number of the abrasive particles was moderate and the abrasive particles did not prevent the nanofluid from entering the matrix of the hydrophilic and hydrophobic stripes. It achieved the self-transport function of nanofluid on the matrix, quickly reduced the heat in the grinding region, reduced the damage to the bone tissue, and improved the success rate of surgery.

Example 3

Figure 1:
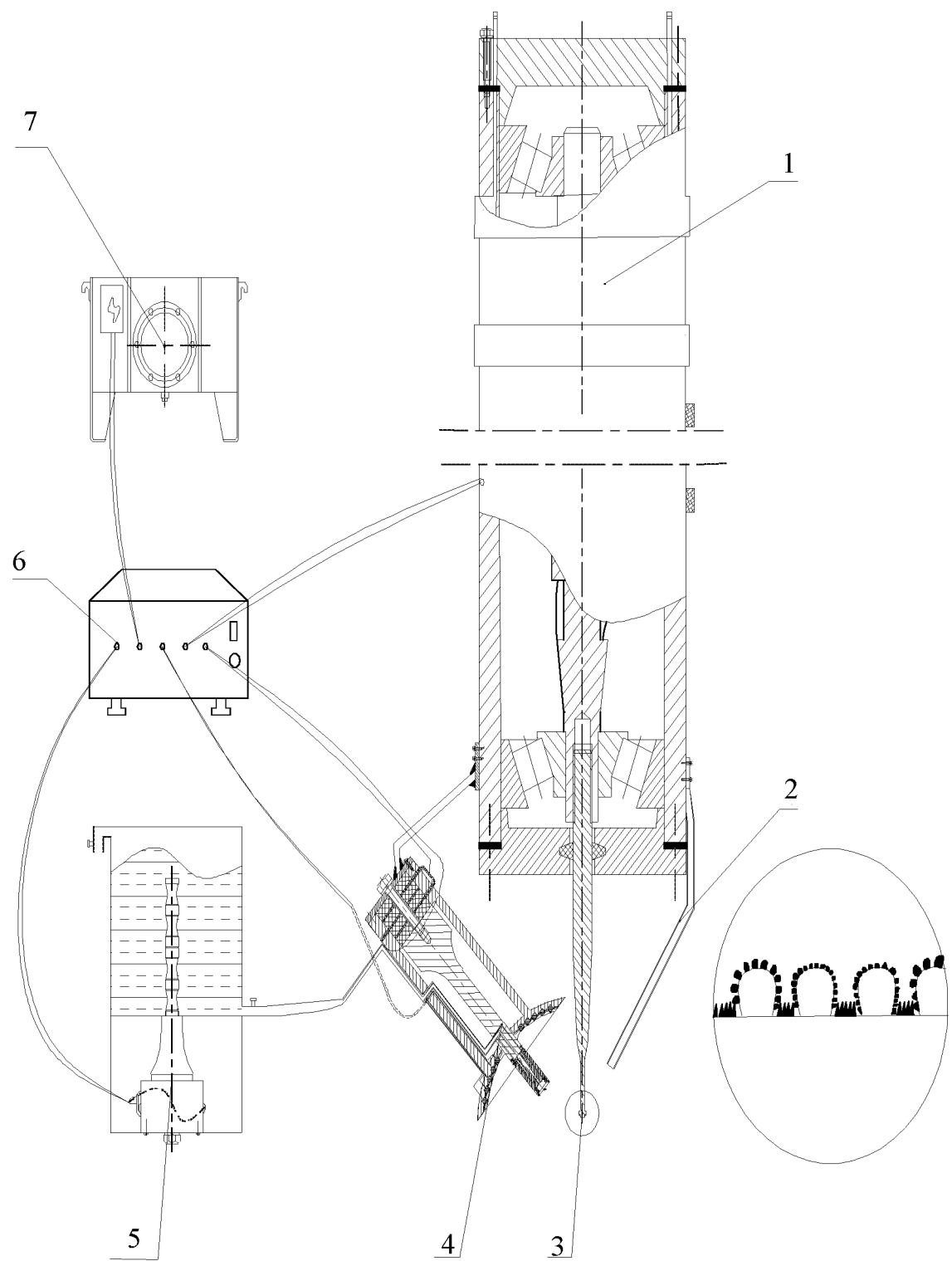
FIG. 1 shows a total device for nanofluid self-transportation and cooling bone microgrinding according to one or more embodiments of the present invention.

This example provided a bionic desert beetle self-transporting bone microgrinding system. As shown in FIG. 1, it included the microgrinding head 3 described in Example 1 or 2, and further included an electric spindle system 1, an atomizing nozzle 4, an ultrasonic sounder 6, a liquid storage tank 5 and a hydraulic station 7. The microgrinding head 3 was installed in the electric spindle system 1. An endoscope 2 was installed on one side of the electric spindle system 1, and the other side of the electric spindle system was connected to the atomizing nozzle 4. The atomizing nozzle 4 was connected to the ultrasonic sounder 6 through the liquid storage tank 5, and the ultrasonic sounder 6 was connected to the hydraulic station 7. At the same time, the atomizing nozzle 4 and the electric spindle system 1 were connected to the ultrasonic sounder 6 respectively.

The structures in CN107789029A were adopted for the electric spindle system 1, the atomizing nozzle 4, the ultrasonic sounder 6, etc.

The working process of this example was as follows.

Before surgery, the self-transporting microgrinding head was installed on an inner-cooling vibrating spindle. The power supply was turned on, and the hydraulic station 7, the ultrasonic sounder 6, the liquid storage tank 5 and the electric spindle system 1 were started. The pneumatic-electrostatic-ultrasonic atomizing nozzle was adjusted. The angle of the nozzle was adjusted, the focal length was adjusted, and ultrasonic focusing was performed to achieve the best cooling effect, and the power supply of the nozzle was turned on.

At the same time, the hydraulic pump sent the nanofluid into the liquid storage tank 5, and a vibrating rod of the liquid storage tank 5 worked to reduce the viscosity of the nanofluid. At the same time, the electric spindle system started to work. After the power interface was powered on, the spindle began to rotate and vibrate longitudinally. The surgical work could be started with the assistance of the endoscope 2. At this time, the self-transporting microgrinding head began to play a role. Through the bionic surface, the droplets would preferentially nucleate and grow in the hydrophilic abrasive particles, making it easier to capture the nanofluid cooling liquid. The captured nanofluid droplets fell off under the action of gravity and a spindle rotation force and took away heat through heat exchange.

At the same time, a part of the nanofluid cooling liquid would touch the hydrophobic surface. When the droplets touched the hydrophobic surface, they would be preferentially transported to the hydrophilic abrasive particles, thereby taking away heat during the transportation process. The droplets that could not touch the hydrophilic abrasive particles would fall off under the action of the rotational force. At the same time, the present invention also designed an inner-cooling double spiral channel inside the self-transporting microgrinding head. The mixed liquid could directly reach the grinding region through the double spiral channel for cooling. Since the cooling liquid continuously entered the microgrinding head, the microgrinding head would start to be cooled internally. The triple action of the bionic surface, the inner-cooling channel and the pneumatic-electrostatic-ultrasonic nozzle, was of great significance for sufficient cooling of the grinding. After the surgery was ended, all power supplies were turned off and the microgrinding head 3 was disassembled. Since the microgrinding head was subjected to hydrophilic and hydrophobic treatment, the microgrinding head was more wear-resistant than a general microgrinding head. Therefore, after the microgrinding head was disassembled, it could be disinfected and stored reasonably, which was convenient for next use.

Example 4

Figure 15:
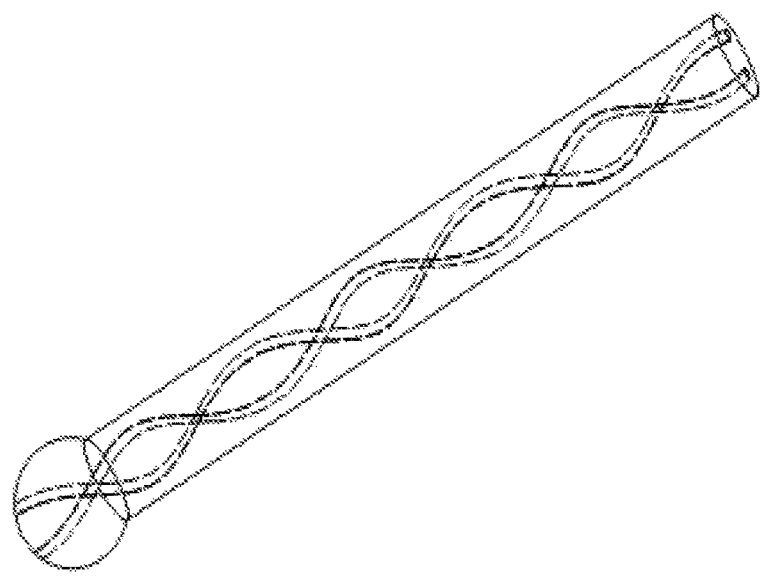
FIG. 15 is an inner-cooling grinding head with a double spiral channel according to one or more embodiments of the present invention.

In this example, the surface of the grinding head was designed so that the microgrinding head had a self-transport function. At the same time, in order to better reduce the temperature of the microgrinding head and the temperature of the grinding region, the tenth example of the present invention adopted the manner of inner-cooling the grinding head. As shown in FIG. 15, the inner-cooling channel ran through the grinding head and a grinding head handle. The nanofluid and the cooling liquid passed through the internal cooling hole and reached the grinding region. Since the nanofluid and the cooling liquid had a temperature lower than that of the body of the microgrinding head, they could take away effective heat and reduce the temperature of the body of the microgrinding head. At the same time, the nanofluid and the cooling liquid entered the grinding region, and could wash away the bone chips, which is conducive for a doctor to better seeing the bone surface and perform the surgery better.

The processing method of this example was simple. After the self-transporting microgrinding head was manufactured, holes penetrating the handle of the grinding head and the grinding head were opened on the handle of the microgrinding head by drilling, to form an uniform array of double spiral channels on a circular surface. Its structure was simple to process and highly practical.

Figure 16:
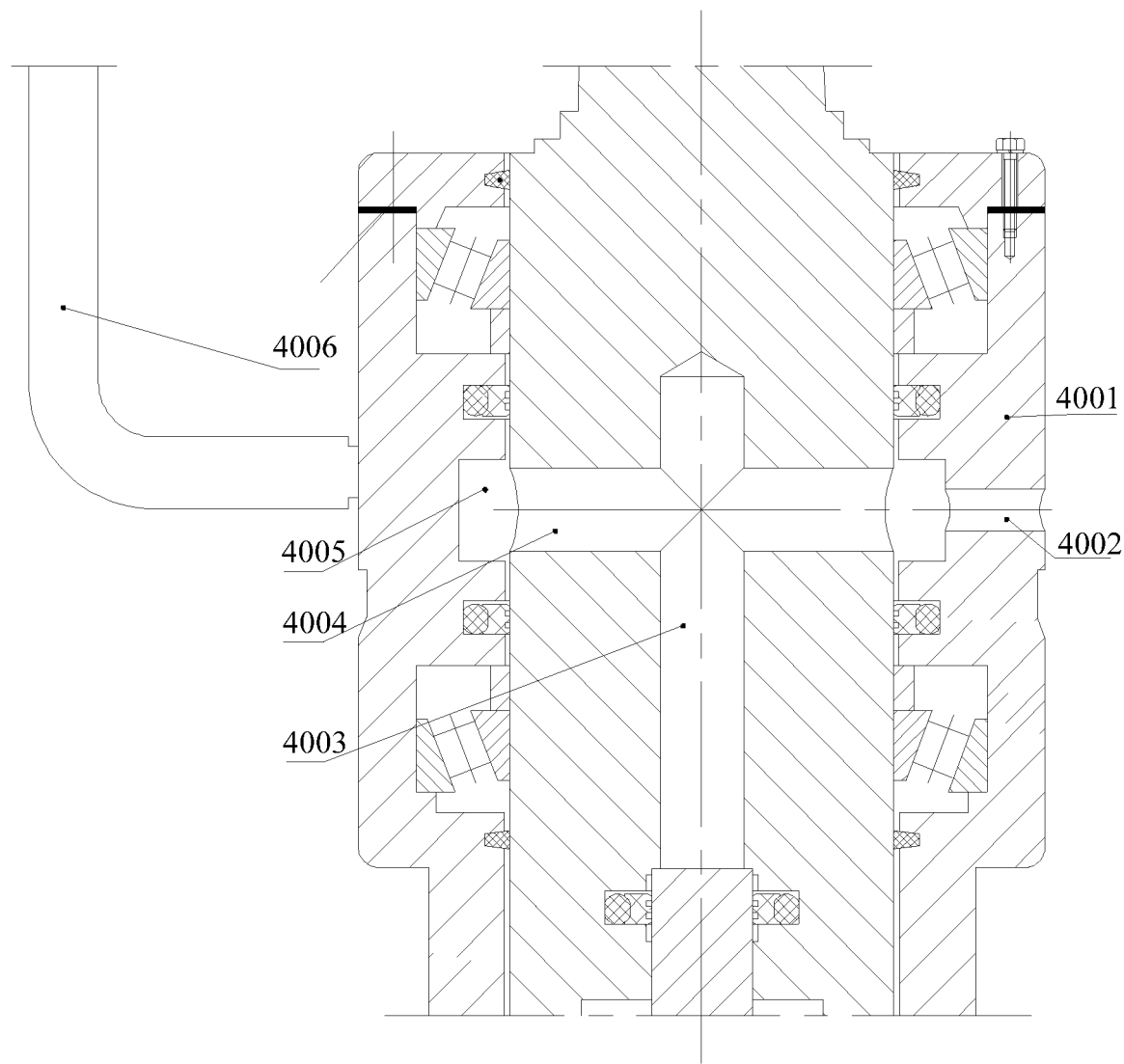
FIG. 16 shows an inner-cooling channel system of a spindle of an inner-cooling grinding head according to one or more embodiments of the present invention.

In order to adapt to the inner-cooling microgrinding head, the spindle system needed to be designed. As shown in FIG. 16, the mixed liquid channel 4006 was an external liquid inlet, and the spindle had holes that penetrated each other. The transverse hole 4004 was a through hole, and a pressure chamber 4005 was next to the transverse hole 4004. There was a cooling liquid inlet 4002 on the spindle housing 4001, and the gas, cooling liquid, and nanofluid entered the annular groove, the transverse hole 4004, and the vertical hole 4003 of the spindle housing 4001 sequentially.

Under the action of an external pressure pump, the gas, cooling liquid and nanofluid were mixed and then pressed into the double spiral through hole of the microgrinding head through pressure. Through the bionic design of the surface of the microgrinding head and the design of the interior of the microgrinding head, during bone grinding surgery, the local grinding temperature was fully reduced, the surgical accuracy was improved, and the occurrence of heat damage was prevented, thereby reducing the risk of the surgery and facilitating postoperative recovery.

The above is only preferred embodiments of the present application, and is not used for limiting the present application. For those skilled in the art, various modifications and variations can be made to the present application. Any modifications, equivalent substitutions, improvements, etc. made within the spirit and scope of the present application should be included within the claimed scope of the present application.

What is claimed is:

1. A microgrinding tool configured to grind bone in a surgical procedure, comprising:
   a shaft; and
   a partially-spherical microgrinding head at an end of the shaft, wherein the microgrinding head is configured to exhibit a biomimetic arrangement of an external surface structure of a desert beetle, the microgrinding head comprising:
   a hydrophobic matrix or a matrix having a hydrophobic plating layer, wherein hydrophilic abrasive particles are distributed at predetermined intervals on a surface of the hydrophobic matrix or on a surface of the hydrophobic plating layer,
   wherein the hydrophilic abrasive particles comprise oxidized diamond abrasive particles,
   wherein the hydrophilic abrasive particles are arranged on the surface of the hydrophobic matrix or the hydrophobic plating layer through electroplating, and
   wherein the hydrophilic abrasive particles are distributed at the predetermined intervals such that the microgrinding head exhibits the biomimetic arrangement of the desert beetle in order to collect nanofluid cooling liquid and reduce the temperature within a grinding region of the bone during the surgical procedure.

2. A process for preparing the microgrinding tool according to claim 1, comprising:
   selecting diamond abrasive particles and conducting an oxidization treatment on the diamond abrasive particles to form the oxidized diamond abrasive particles;
   scanning a surface of another matrix by using a laser to form the hydrophobic matrix; or
   obtaining the hydrophobic plating layer on the surface of the another matrix by using a chemical modification method;
   and
   binding the oxidized diamond abrasive particles with the surface of the hydrophobic matrix or the surface of the hydrophobic plating layer by the electroplating to obtain the microgrinding head.

3. The process according to claim 2, wherein the step of forming the oxidized diamond abrasive particles comprises firstly selecting diamond abrasive particles with a same volume and structure, then putting the diamond abrasive particles which are selected into a tube furnace, and introducing pure nitrogen into the tube furnace; wherein a heating temperature of the tube furnace is greater than 600° C., and a high-temperature oxidation time of the tube furnace is 10-20 min.

4. The process according to claim 2, wherein the step of forming the hydrophobic matrix comprises cleaning the another matrix for a predetermined cleaning duration by placing the another matrix in an ultrasonic cleaner and then drying the another matrix which is cleaned at room temperature, scanning the surface of the another matrix after the drying by using the laser for a predetermined scanning duration, after the scanning, soaking the another matrix in a stearic acid absolute ethanol solution, then taking the another matrix out of the stearic acid absolute ethanol solution, and then drying at room temperature to obtain the hydrophobic matrix.

5. The process according to claim 2, wherein the step of forming the hydrophobic plating layer comprises firstly pretreating the another matrix; using the another matrix which is pretreated as a cathode and using a pure nickel plate as an anode putting the cathode and the anode into a plating solution, performing an electrodeposition treatment by using a water-bath heating to heat the plating solution then placing the another matrix after the electrodeposition treatment in an ethanol solution for a predetermined duration, and obtaining the hydrophobic plating layer after drying.

6. A microgrinding tool configured to grind bone in a surgical procedure, comprising:
a shaft; and
a partially-spherical microgrinding head at an end of the shaft, wherein the microgrinding head is configured to exhibit a biomimetic arrangement of an external surface structure of a desert beetle, the microgrinding head comprising:
a matrix, wherein hydrophilic stripes and hydrophobic stripes are arranged alternately at predetermined intervals along a circumferential direction on a surface of the matrix, a plurality of grooves formed at predetermined intervals along the circumferential direction on the surface of the matrix, and
diamond abrasive particles disposed in the plurality of grooves, wherein the plurality of grooves are filled with an adhesive to fix the diamond abrasive particles, wherein the hydrophilic stripes and hydrophobic stripes are arranged at the predetermined intervals such that the microgrinding head exhibits the biomimetic arrangement of the desert beetle in order to collect nanofluid cooling liquid and reduce the temperature within a grinding region of the bone during the surgical procedure.

7. The microgrinding tool according to claim 6, wherein a width of each of the plurality of the grooves is smaller than a width of each of the hydrophilic stripes and a width of each of the hydrophobic stripes.

8. A process for preparing the microgrinding tool according to claim 7, comprising:
pretreating the surface of the matrix;
forming the hydrophilic stripes sequentially arranged on the surface of the matrix by a laser scanning treatment;
placing the matrix which is laser-treated in a stearic acid absolute ethanol solution for a predetermined soaking duration, and then drying to turn the hydrophilic stripes into the hydrophobic stripes, obtaining the matrix having the hydrophobic stripes after the drying;
re-scanning the surface of the matrix dried and having the hydrophobic stripes by the laser scanning treatment to remove a stearic acid absolute ethanol film on the surface of the matrix according to a predetermined pattern, so as to obtain the hydrophilic stripes and the hydrophobic stripes arranged alternately on the surface of the matrix; and
notching the plurality of grooves on the surface of the matrix with intervals along the circumferential direction of the surface of the matrix, and disposing the diamond abrasive particles in the plurality of grooves.

9. The process according to claim 8, further comprising filling the plurality of grooves full of the adhesive, placing the diamond abrasive particles into the plurality of grooves, and bonding and fixing the diamond abrasive particles in the plurality of grooves by performing a heat treatment.

10. A process for preparing the microgrinding tool according to claim 6, comprising:
pretreating the surface of the matrix;
forming the hydrophilic stripes sequentially arranged on the surface of the matrix by a laser scanning treatment;
placing the matrix which is laser-treated in a stearic acid absolute ethanol solution for a predetermined soaking duration, and then drying to turn the hydrophilic stripes into the hydrophobic stripes, obtaining the matrix having the hydrophobic stripes after the drying;
re-scanning the surface of the matrix dried and having the hydrophobic stripes by the laser scanning treatment to remove a stearic acid absolute ethanol film on the surface of the matrix according to a predetermined pattern, so as to obtain the hydrophilic stripes and the hydrophobic stripes arranged alternately on the surface of the matrix; and
notching the plurality of grooves on the surface of the matrix with intervals along the circumferential direction of the surface of the matrix, and disposing the diamond abrasive particles in the plurality of grooves.

11. The process according to claim 10, further comprising filling the plurality of grooves full of an adhesive, placing the diamond abrasive particles into the plurality of grooves, and bonding and fixing the diamond abrasive particles in the plurality of the grooves by performing a heat treatment.

\* \* \* \* \*